United States Patent
Gordish et al.

[11] Patent Number: 5,233,160
[45] Date of Patent: Aug. 3, 1993

[54] CORED ELECTRODE WITH FUME REDUCTION

[75] Inventors: Ronald J. Gordish, Kirtland; Robert P. Munz, Jefferson; Dennis D. Crockett, Mentor, all of Ohio

[73] Assignee: The Lincoln Electric Company, Cleveland, Ohio

[21] Appl. No.: 902,020

[22] Filed: Jun. 22, 1992

[51] Int. Cl.$^5$ ............................................. B23K 35/22
[52] U.S. Cl. ..................... 219/137 WM; 219/145.22; 219/146.22; 219/146.3
[58] Field of Search ............. 219/145.22, 146.22, 219/146.1, 146.3, 146.31, 146.24, 137 WM

[56] References Cited

U.S. PATENT DOCUMENTS

| | | | |
|---|---|---|---|
| 3,558,851 | 1/1971 | Oku | 219/146 |
| 3,702,390 | 11/1972 | Blake et al. | 219/146.22 |
| 4,122,238 | 10/1978 | Frantzerb | 428/558 |
| 4,186,293 | 1/1980 | Gonzalez | 219/146.24 |
| 4,510,374 | 4/1985 | Kobayashi | 219/146.1 |
| 4,833,296 | 5/1989 | Crockett et al. | 219/145.22 |
| 5,124,529 | 6/1992 | Nishikawa et al. | 219/146.22 |

Primary Examiner—Clifford C. Shaw
Attorney, Agent, or Firm—Body, Vickers & Daniels

[57] ABSTRACT

A consumable welding electrode for electric arc welding in a shielding gas and producing reduced amounts of fume during said welding comprising in combination a steel sheath and a filler within the sheath. The filler including metallic aluminum powder and a dual stabilizing agent of sodium oxide and potassium oxide, wherein the dual stabilizing agent and said aluminum have about a 2.4:1 to 3.5:1 weight ratio.

26 Claims, 1 Drawing Sheet

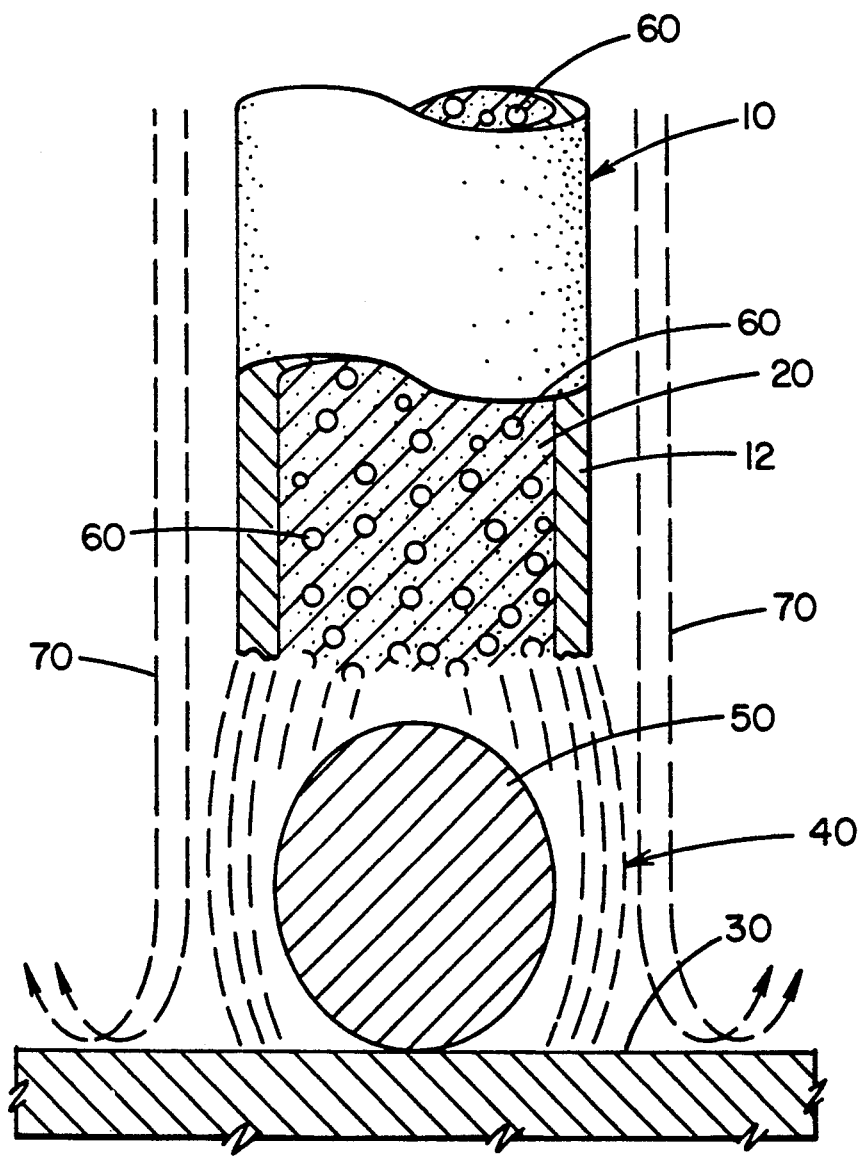

CORED ELECTRODE WITH FUME REDUCTION

The present invention pertains to the art of electric arc welding and more particularly to the improved flux formulation for a flux cored electrode to be used with gas shielding. The invention is particularly applicable to reduced fume producing flux cored electrode for use with non-stainless material and will be described with particular reference thereto although it is appreciated that the invention has much broader applications and can be used as a reduced fume electrode having improved deposition rates, penetration, high quality mechanical properties and improved weld bead profile characteristics.

INCORPORATION BY REFERENCE

Gonzalez U.S. Pat. No. 4,186,293 is incorporated by reference herein as illustrating a typical self shielded cored arc welding electrode with the core material being formulated to reduce the amount of fume. The electrode employs the deoxidizing and denitriding agents in combination to provide protection to the weld metal from atmospheric contaminants. This type of electrode is technically distinguished from and functions different thermodynamically and chemically from a cored electrode of the type to which the present invention is directed which employs an outer shielding gas and does not employ deoxidizers for the purpose of providing protection to the weld metal. This prior Gonzalez patent is incorporated by reference herein to show the typical type of core material employed in the completely different electrode technology where self shielding gases are released during the thermal and chemical reaction associated with the core material. This patent uses high percentages of aluminum for the purpose of reacting with the atmospheric contaminants and the material formulating the core of an electrode to form a low melting slag and to provide protection to the weld metal.

Frantzerb U.S. Pat. No. 4,122,238 relates to an electrode of the type used with external shielding gas, such as carbon dioxide, utilizing in the core, an alloy containing four metals, one of which may or may not be aluminum. Magnesium and manganese form two components of the alloy. By employing this unique alloying concept in a titanium dioxide fluxing system, it is alleged that there is a reduction of particular matter emission in the form of fume. This electrode has a core that requires the use of magnesium which would be detrimental to a core material constructed in accordance with the present invention; however, the disclosure is incorporated by reference herein as background information regarding efforts to reduce fume in a shielded gas type of cored electrode.

The present invention relates to the use of metallic powdered aluminum in the core of an electrode used in arc welding with an external shielding gas. In the preferred embodiment, the electrode employs a specific amount of a unique arc stabilizing blend also contained in the core. As background information regarding such electrodes, there is incorporated by reference herein Oku U.S. Pat. No. 3,558,851. This patent illustrates the use of an alloy of iron and aluminum in a cored electrode used for arc welding with carbon dioxide shielding gas. The aluminum portion of the ferroaluminum alloy is in the range of 0.05 to 0.80% of weight of the total electrode. However, the aluminum contained in the core material does not react directly in the arc since the aluminum is always in the alloy form with iron. At the higher ranges of aluminum alloy, the arc is not stable and there is a need for arc stabilizers which are generally defined as the oxides of alkali metals in combination or alone. There is no suggestion of any particular arc stabilizing constituents, the use of a blend for arc stabilizing constituents or the amount of arc stabilizing constituent as it relates to the small amount of aluminum alloy provided in the gas shielded electrode. This background patent is incorporated by reference herein for the purpose of explaining the use of minor amounts of ferro aluminum as a killing agent for the deposited metal formed during the arc welding process.

Kobayashi U.S. Pat. No. 4,510,374 relates to the common concept of reducing the carbon content in the metal sheath of a flux cored electrode used in gas shielded arc welding. This electrode explains the need for and one concept of fume reduction and how the fume can be reduced during an arc welding process using a flux cored electrode with an external shielding gas. The electrode of this patent includes a titanium dioxide fluxing system and explains various components of the particulate material forming the core of the electrode. The electrode employs magnesium oxide, aluminum oxide and iron oxide as the constituents effective in reducing the fume emission rate as the cored electrode is employed in an arc welding process. It is also mentioned that titanium dioxide, silicon dioxide and zirconium dioxide are believed to be effective in reducing the fume rate. This patent contends that the above identified oxides all contribute to reduction of the fume emission during the welding process. There is speculation that sodium fluoride increases the fume emission rate. Reduction in the fume emission rate is allegedly caused by use of a low carbon steel in the sheath for the cored electrode. Ferro aluminum is a killing agent for the metal of the weld bead. This patent is incorporated by reference herein discloses a titanium base flux in a flux cored electrode to be used with external shielding gas wherein the amount of titanium dioxide, silicon dioxide, aluminum oxide, zirconium dioxide, iron oxide and magnesium oxide are reduced and used with sodium fluoride, as a stabilizing agent, and an alloy deoxidizer for killing the steel of the weld bead. Ferroaluminum is disclosed as an alloy to perform the function of a deoxidizer. Standard flux composition is combined with a low carbon steel sheath to reduce fume caused by welding with the electrode.

These several patents, incorporated herein, explain the problem of fume created by a cored electrode of the type specifically designed for external shielding gas. These several patents explain the problem of fume production in cored electrodes specifically designed for external shielding gas. The only teaching of these patents of the mechanism for reducing the fume is the reduction of the carbon in the steel sheath around the electrode, reduction of certain oxides or use of a specially formulated alloy including several metals, one of which may or may not include aluminum.

BACKGROUND OF INVENTION

In the field of electric arc welding there are a number of criteria upon which an electrode is evaluated by the welding industry. One of the most important criteria for an electrode is that the electrode must produce a solid, non-porous weld bead which has a tensile strength, ductility and Charpy impact value to sufficiently meet the desired end use of the welding material. With the advent of cored electrodes, including a steel sheath surrounding a core having a fluxing system and various alloying agents, there is a tremendous demand that the impact values and tensile strength be formulated to meet the requirements for a wide range of welding applications. There is a demand that the resulting weld bead have properties approaching the values obtainable in a solid wire when used in an arc welding process. Consequently, there is a tremendous demand for the formulation of a cored electrode of the type employing an external shielding gas having a desired tensile strength and an acceptable Charpy impact characteristic. Both the tensile strength and Charpy impact values are directly affected by the ultimate deposited weld metal chemistry and porosity of the weld bead after the welding process. Porosity can be caused by gases, such as nitrogen from the air, combining in the heat of the arc with the metals of the electrode as they are transferred from the electrode to the weld pool. The nitrogen components in the deposited molten metal are released as the deposited weld metal cools and solidifies. Nitrogen is normally prevented from coming into contact with the weld metal of the molten pool produced by the electric arc by including several fluxing materials, such as metal fluorides and metal oxides. These fluorides and oxides are in the core of the electrode and are released from the end of the electrode during the welding process. The electric arc and the molten metal pool in an electrode to which the present invention is directed is further shielded by flowing a continuous stream of nitrogen-free gas around the outer surface of the electrode toward the workpiece. This gas forms an envelope around the arc and prevents the nitrogen in the air from penetrating into the arc area to introduce nitrogen and oxygen into the arc and thus the molten metal formed during the welding process. The nitrogen free gas is normally argon, helium, carbon dioxide or another inert gas or mixtures thereof to shield the weld pool from nitrogen of the atmosphere. This process inhibits porosity within the weld bead as the weld bead cools.

The present invention is specifically directed to a shielded gas flux cored electrode and primarily to such an electrode having a titanium dioxide fluxing system with various oxide and certain alloying metals. The required tensile strength and Charpy impact values are normally obtained by adding various alloying ingredients to the core of the electrode, which alloys with the molten metal of the sheath to formulate a deposited weld metal bead having the desired metallurgical chemistry. The alloys which are normally incorporated in the core to form the desired alloy of the weld metal are carbon, chrome, nickel, manganese, boron, molybdenum, titanium, zirconium, and silicon. Other metals can be added in various amounts to achieve the desired Charpy impact values and tensile strength of the weld bead material. The various alloy agents or metals can be added either as elements, ferro alloys, alloys themselves, and/or oxides in combination with suitable reducing agents.

Another important criteria of welding electrodes includes the ability to weld in all positions. Different components in the core of the flux cored electrode are required to both enable the electrode to produce satisfactory weld bead profiles in both down hand, vertical and overhead positions. To produce satisfactory weld bead profiles, the flux in the core of the electrode must contain slag forming ingredients which will float to the surface of the weld bead as it cools. This slag protects the weld bead from adverse gases contained in the atmosphere which could produce pores in the weld bead during the solidification process of the material forming the weld bead. These flux ingredients are proportioned so that the solidification temperature of the mixture is below the solidification temperature of the weld bead. In this manner, the slag material on the surface of the weld bead does not adversely affect the normal shape of the surface of the weld bead as it is solidifying. In out-of-position welding, such as vertical and overhead welding, the slag formed from the material contained in the flux system of the core must not only coat the surface of the weld bead, but must also shape the profile of the bead as it solidifies. Such slag must be controlled to have sufficient viscosity so that the slag supports the molten metal of the bead in a desired position against the force of gravity during the solidification process. These two criteria of allowing the metal to solidify first and having sufficient viscosity to hold the molten metal in a desired shape when welding out of position are satisfied by known selection of the constituents in the flux system of the cored electrode. Consequently, by the proper selection of the constituents of the fluxing system a smooth weld bead having the desired profile can be created in both down hand welding and out-of-position welding.

The selection of the flux material of the electrode must also allow for easy removal of the slag after both the weld bead and flux have solidified. The various constituents to obtain the desired effect and physical characteristics of the slag created during the arc welding process are well known in the electrode technology. However, in the past, such flux cored gas shielded electrodes that contain the proper fluxing constituents and alloying agents to create the desired slag and the proper weld bead chemistry have been found to produce considerable amounts of fume, or particulate matter, which is somewhat annoying and undesirable in an arc welding process as disclosed and discussed in the various patents incorporated by reference herein.

Efforts have been made to reduce the fume created by a cored electrode used in arc welding with an external fuming gas. Fume reducing must be by a mechanism which does not destroy the ability of the electrode to perform the criteria of a weld bead having the chemistry required to attain the desired mechanical properties to produce a weld bead that is free of porosity and to produce the slag characteristics necessary for formulating the shape of the weld bead. The reduction of fume produced by such electrodes is desirable for comfort of the welder and to reduce the necessity for expensive and complicated fume exhaust systems associated with the welding process. The lower fume production of the electrode eliminates the need for expensive and bulky fume exhaust systems which are required during welding in a confined area. In addition, the welding fumes can obscure the visual observation of the weld puddle itself during the welding process. Consequently, it is desired to formulate a flux cored electrode to be used in a shielded gas welding process which maintains the desired alloying characteristics and slag characteristics with a reduction in the amount of generated fume. Prior attempts to accomplish this objective have not been successful since the prior electrodes have employed an alloying agent or reduction of carbon which only reduced a small amount of the fume created by arc welding with an external shielding gas.

THE INVENTION

The present invention contemplates a new and improved formulation of ingredients in the flux cored electrode which enables high quality weld beads in both down hand and out-of-position welding while producing reduced amounts of fume. The invention also improves the out-of-position ability of the slag to hold the metal of the weld bead in the proper bead shape, as well as increase the deposit rate obtainable by the electrode.

In accordance with the present invention there is provided a consumable cored electrode for gas shielded arc welding which produces reduced amounts of fume during the welding process. The electrode comprises a low carbon steel sheath with less than 0.07% by weight of the sheath being carbon and a fill material within the sheath, which fill material is essentially free of non-ferrous carbon compounds and contains 0.5–5.0% metallic aluminum powder.

In accordance with another aspect of the present invention there is provided a method of arc welding with a shielding gas to produce a reduced amount of fume during the welding process. The method comprises the steps of using a cored electrode with a ferrous sheath having less than 0.07% carbon and a fill material essentially free of carbon powder and non-ferrous carbon compounds and containing 0.5 to 5.0% by weight of the fill material of metallic aluminum powder, and preferably less than about 2.0% by weight of aluminum powder.

In accordance with a specific aspect of the present invention, the formulation for the flux cored electrode to be used in a gas shielded environment is provided with metallic aluminum powder as a fume reducing agent. It has also been found that the metallic aluminum powder acts as an agent for effecting the chemistry of the weld metal forming the resulting bead. The use of metallic aluminum powder in a gas shielded arc system is contrary to the conventional wisdom and the teaching of prior gas shielded flux cored electrodes. In the past, aluminum was introduced in gas shielded arc systems either as aluminum oxide for slag modification or as ferro-aluminum in limited amounts for deoxidation. Aluminum in the oxide form prevented non-oxidized aluminum from transferring into the weld metal and adversely affecting the toughness of the weld bead. The present invention employs the metallic aluminum powder in the core of the electrode to reduce the fume from the welding process. The aluminum powder reacts directly in the arc, which forms a reaction zone surrounded by shielding gas, to absorb surrounding oxygen, to reduce fume producing oxides and to improve the toughness of the resulting weld metal.

During the arc welding process, high temperatures are created within the arc itself which provide energy for rapid oxidation of various elements and compounds. By reducing the amount of available oxygen in the arc itself by the metallic aluminum powder in the core of the electrode, the amount of oxidation of the other elements during the welding process is substantially reduced. The reduction of the oxidation reduces the amount of fume created during the welding process.

The metallic aluminum powder also has an effect on the total nitrogen content in the weld metal, which affects the strength and Charpy characteristics of the weld metal itself. It is well documented that more nitrogen is absorbed into the welding arc in the presence of oxygen due to the formation of NO. When aluminum reacts with oxygen in the arc, it removes oxygen necessary for formulation of the nitrogen oxide. In addition, the aluminum forms a compound with the nitrogen of the weld metal. This nitrogen compound is more volatile than titanium nitride and is in vapor form at the solidification temperature of the weld metal. Thus, the aluminum nitride is removed from the weld material to reduce the amount of nitrogen to the extent greater than titanium can remove the nitrogen. This is a secondary advantage of using the metallic metal powder of the present invention. Nitrogen is known for its adverse effect on the porosity of the weld bead and its deleterious effect upon weld metal Charpy V-notch properties. Consequently, the present invention has the advantage of improving the physical characteristics of the weld bead metal while also reducing the fume when the electrode is employed for gas shielded electric arc welding. The formulation of small amounts of dispersed nitride compounds in the weld metal can enhance the mechanical properties of the weld metal.

Metallic aluminum powder when used in the core of the electrode combines with oxygen and nitrogen in the reaction zone of the arc to reduce the fume forming agents in the arc between the electrode and workpiece while further enhancing the weld bead mechanical properties by formulating aluminum nitride particles which reduce the amount of free nitrogen in the weld metal. In addition, the metallic aluminum powder reduces titanium dioxide and boron oxide to control the amount of titanium and boron alloyed in the weld bead. The use of aluminum oxide in the flux does not substantially contribute to the reduction of fume produced by oxidation since aluminum in that instance is already in the oxidized form. Further, aluminum oxide can not assist in the reduction of oxygen and/or nitrogen in the weld pool which allows the increase of oxygen and nitrogen in the weld pool to increase the amount of porosity. Although aluminum oxide is a very useful slag agent, aluminum oxide is also an oxide with a very high melting point which can only be used in controlled amounts as a flux constituent in a fluxing system for a cored electrode.

The present invention employing metallic aluminum powder in the core introduces the aluminum powder in its metallic form at the upper portion of the reaction zone created by the electric arc of the welding process. This minimizes the oxidation of the other elements in the arc to reduce fume generation by the arc. The remaining aluminum, if any, enters the weld bead metal. It serves to deoxidize the weld metal and to form nitrides to reduce the nitrogen within the weld bead. Any aluminum that has entered the weld bead is no longer effective in further reducing the fume level.

Aluminum oxide can be employed with the metallic aluminum powder allowing the aluminum oxide in the flux to control the desired flux or melting range and viscosity of the slag. The metallic aluminum reduces the fume produced in the arc during the welding process and reduces the oxygen and nitrogen in the weld pool itself. Thus, the invention which has a primary function of reducing the fume created during the welding process also improve the weld metal chemistry to enhance the strength and impact characteristics of the solidified weld bead. The improved weld metal transfer resulting from reduced oxygen and nitrogen content in the weld metal reduces spatter and increases the deposited efficiency while improving the appeal of the process to the welder. Aluminum oxide should be in a controlled amount since it decreases the viscosity of the slag; however, a slag having a viscosity too low will form globules and not cover the weld metal evenly and smoothly. Thus, the aluminum oxide if used in the electrode of the invention must have a controlled amount. The amount of aluminum oxide does not change the amount of metallic aluminum powder used in the present invention.

Metallic aluminum powder is introduced into the fluxing ingredient as essentially pure aluminum powder which can react in the zone created above the weld metal by the electric arc of the welding process. Consequently, reduction of various oxides, reduction of oxygen and nitrogen and other advantageous characteristics of the present invention are effected in the welding arc above the weld metal pool. As the small amount of aluminum remaining after this novel arc reaction process enters the weld metal the aluminum in the metal fixes the free nitrogen and free oxygen in the weld metal. An aluminum alloy would enter the weld metal and be available for nitrogen and oxygen reduction as in a killing process. The present invention does not relate to that killing process except as an ancillary advantage of the present invention.

In accordance with another aspect of the present invention, a dual stabilizing agent is added to the flux formulation to reduce fume and stabilize the arc during the welding process. The specific stabilization is required due to the introduction of metallic aluminum powder that reacts directly in the arc or reaction zone of the welding process. The dual stabilization agent of the present invention comprises sodium oxide and potassium oxide. During welding at lower wire feed rates, the potassium oxide shortens the arc which results in a smooth arc transfer and a reduced amount of fume. During arc welding at higher wire feed rates, the sodium oxide increases the arc stability while reducing the amount of fumes produced. The amount of dual stabilizing agents used in the flux formulation of the present invention is controlled to have a weight percentage ratio of approximately 2.4 to 3.5 of stabilizing agents to one part metallic aluminum powder. Although the exact mechanism of why the combination of metallic aluminum powder and the specific dual stabilizing agents interact to both reduce the fume and produce a high quality weld bead is not known, it has been found that this particular weight ratio of dual stabilizing agent to metallic aluminum powder is important to achieve the desired mechanical properties of the resulting weld metal in the weld bead. The metallic aluminum powder reacts with the other fluxing materials, primarily oxide, to reduce the volume of fume created during the welding process. Although the oxidation by the aluminum powder during the welding process reduces much of the fume produced during the welding process, in practice the amount of fume produced without the specific dual stabilizing agents was still more than desired. It appears that the potassium oxide and sodium oxide individually produce approximately the same amount of fume in the welding process. A combination of sodium oxide and potassium oxide used in the fluxing formulation of the present invention is preferably approximately 1:1 of sodium oxide to potassium oxide. This ratio can be adjusted based upon whether a high or low welding current is desired for the welding process. As the sodium oxide increases, the viscosity of the slag decreases. Further, the sodium oxide is increased for increased currents and, thus, feed speed.

The amount of metallic aluminum used in combination with the dual fluxing agents is also important. Aluminum powder which does not oxide during the welding process will transfer to the weld pool as a residual or alloying agent. Substantial amounts of residual aluminum in the weld bead will deteriorate the Charpy notch toughness of the weld bead metal. Consequently, it has been found that the metallic aluminum powder is to be less than 5.0% of the flux material, and preferably less than 2.0%. In addition, the aluminum in the weld bead must be no more than approximately 0.10%. In practice, the metallic aluminum powder is in the range of 0.5% to 5.0% and preferably less than 2.0% for fume reduction. The amount of aluminum powder can be increased to approximately 5.0% when it is desired that residual aluminum and increased reduction of titanium and boron is desired.

In accordance with another aspect of the present invention, a titanium dioxide flux system is employed in the flux cored electrode. This fluxing system includes various slag control elements and alloying agents. Titanium dioxide primarily in the form of rutile has been found to provide the desired characteristics needed for both down hand and out-of-position welding. Various other slag control agents such as aluminum oxide, zirconium oxide, silicon dioxide and fluorides with other metals are added to enhance the desired viscosity and removability characteristics of the resulting slag.

In accordance with another aspect of the present invention the metallic alloying agents of the cored electrode, such as silicon, titanium, manganese, zirconium, molybdenum, and other metals can be added to obtain the properties desired in the resulting weld metal.

The present invention involves an electrode for using a shielding gas, such as carbon dioxide or argon blends with carbon dioxide. This external gas is employed to shield the weld pool and the arc from adverse gases contained in the atmosphere. Consequently, the shielding gas forms an envelope around the arc and above the weld metal pool to exclude the atmosphere. This shielding gas, in the present invention, is used because the flux formulation is not designed to produce its own self shielding gas or to produce a weld deposit chemistry that can develop sound welds without the use of an external shielding gas. The self shielding gas type of cored electrodes are a completely different technology. Such electrodes are designed to release gases and provide a slag protection to shield the weld pool from the atmosphere without the use of external gases. A substantial quantity of nitrogen killing agents such as aluminum and/or titanium are added to the core of such electrodes to perform a killing function in the weld metal. Such self shielded electrodes do not have a gas envelope surrounding the arc for the purpose of creating a reaction zone above the weld metal and in the arc area. An electrode of the present invention has a flux system or formulation which does not contain compounds that in themselves produce a shielding gas to prevent atmospheric gas, such as nitrogen, from adversely affecting the weld bead. Consequently, the technology employed in the present invention relates to the cored electrode technology which requires an external shielding gas source to protect the weld bead. Such technology has not heretofore employed aluminum for reaction in the arc above the weld metal as contemplated by the present invention.

The present invention can use carbon dioxide in its pure form as a shielding gas and does not require a combination or blend with more expensive inert gases such as argon and helium. Prior electrodes designed especially for use of a pure carbon dioxide have resulted in a more unstable arc and excessive spatter. Consequently, prior electrodes of the flux cored type for use with a pure carbon dioxide shielding gas produce poor bead appearance, reduced weld efficiency and require undesired cleaning expenditures. The dual stabilizing agents utilized in the present invention alleviate past problems experienced with conventional electrode using only $CO_2$ as a shielding gas. The dual stabilizing agents stabilize the arc during both low and high feed rates and assists in transfer of metal into the weld pool. Although pure carbon dioxide is preferred in the present invention as the shielding gas, carbon dioxide can be combined with the more standard inert gases such as argon and helium.

The primary object of the present invention is the provision of a gas shielded flux cored electrode containing metallic aluminum powder for reaction in the arc area to reduce fume.

Another object of the present invention is the provision of a gas shielded gas electrode containing metallic aluminum powder and produce a reduced amount of fume during the arc welding process.

Still a further object of the present invention is the provision of an electrode, as defined above, which electrode contains a combination of dual stabilizing agent and metallic aluminum powder in the core of the electrode.

Still a further object of the present invention is the provision of a gas shielded electrode, as defined above, which electrode contains a dual stabilizing agent and system which is in a ratio of agent to metallic aluminum powder of about 3:1.

Still a further object of the present invention is a dual stabilizing agent, as defined above, which agent comprises sodium oxide and potassium oxide.

Still a further object of the present invention is the provision of a gas shielded electrode, as defined above, which electrode includes metallic aluminum powder, a dual arc stabilizing agent and a titanium dioxide flux system to produce reduced amounts of fume and which can be used to weld out-of-position.

Yet another object of the present invention is the provision of an electrode, as defined above, which electrode not only reduces fume, but improves the mechanical properties of the weld bead metal by reducing the amount of nitrogen in the weld metal and fixing the nitrogen in the weld metal as aluminum nitride.

These and other objects and advantages will become apparent from the following description taken together with the accompanying drawing which is a partial cross-sectional view of the preferred embodiment of the present invention as used in an arc welding process with external shielding gas.

PREFERRED EMBODIMENT OF THE INVENTION

The preferred embodiment of the present invention is an electrode classified under The American Welding Society A5.20 specification as an E71T-1 electrode which is shown in the drawing as electrode 10. The electrode has an outer low carbon sheath 12 with particulate interior fill material or core 20. During the welding process, electrode 10 is connected to a power supply to deposit molten metal in a weld bead pool 30 by the heat of electric arc or plasma 40. The arc melts metal sheath 12 and melts the material within core 20 before the material is deposited into the weld bead pool 30. Arc 40 is generally conical in nature and includes a high temperature reactive zone 50 between electrode 10 and weld bead pool 30. This zone is characterized as extremely high temperature to cause chemical reactions of the molten metal of sheath 12 and the various alloying and fluxing constituents contained in core 20. In accordance with the present invention, core 20 contains metallic aluminum powder, schematically represented as particles 60. This powder is in substantially pure aluminum form to cause chemical reactions in zone 50 prior to the time that the molten metal from the core and sheath are transferred to weld bead 30. Carbon dioxide or other appropriate shielding gas 70 forms a cylindrical envelope around arc 40 and zone 50 to prevent ingress of moisture, nitrogen, oxygen and other constituents of the surrounding atmosphere. In the reaction zone 50 aluminum powder 60 reduces the oxides that form fume. In accordance with the present invention carbon in the sheath 12 is less than approximately 0.07% by weight of the metal in the sheath. This low carbon prevents further fume production. Thus, the reduction in carbon, together with the inclusion of active metal aluminum powder in the reaction zone 50 substantially reduces the amount of fume created during the welding process.

Electrode 10 is specifically designed for use with shielding gas 70. The electrode metal sheath 12 is a low carbon ferrous metal sheath; consequently, this low content of carbon assist in reduction of fume production and also arc penetration at high electrode feed rates. Although the metal sheath preferably has carbon content of less than 0.07% carbon by weight it is preferred that the sheath has less than 0.04% carbon by weight. Core 20 contains a flux formulation which includes metallic aluminum powder 60, a dual stabilizing agent, a titanium dioxide based flux system, normal slag viscosity magnifiers and a variety of common alloying ingredients. The flux formulation may be added to the tubular sheath in any conventional manner. The sheath is formed of a metal which is consumed during the welding process and transfer directly into the molten weld metal pool 30 as shown in the drawing.

The amount of metallic aluminum powder 60 in the flux formulation of core 20 is controlled to obtain the desired fume reduction characteristics, without sacrificing mechanical properties of the metal in the weld bead 30. It has been found that the aluminum powder must be no greater than the amount which will create 0.1% aluminum in the deposited weld metal material. The amount of aluminum powder is further controlled to reduce the desired amount of oxygen and nitrogen in the weld pool. The molten steel in the pool for solidification has a high affinity for oxygen and nitrogen. Shielding gas 70 prevents oxygen and nitrogen from entering the weld pool from the atmosphere. However, ferrous oxide and ferrous nitrides can precipitate in the weld metal from oxygen and nitrogen which have not been entirely excluded by the envelope of shielding gas. These oxides and nitrides of iron may result in substantial weakening and embrittlement of the weld bead material. In addition, uncombined free nitrogen in the weld pool can also contribute to the porosity of the weld metal due to the rapid escaping of the nitrogen gas when the pool is cooling during solidification.

The amount of metallic aluminum powder within the flux formulation of core 20 is preferably in the range of 0.5 to 2.0% by weight of flux material which, considering a percentage of fill between 13.5 to 16.5% electrode, provides metallic aluminum between 0.07 to 0.31% of the total electrode weight. Preferably, about 0.13 to 0.18% of the total electrode weight is metallic aluminum powder. Metallic aluminum concentrates at levels of the invention exhibit highly desirable fume reduction qualities and the proper nitrogen and oxygen control characteristics in the weld bead material itself. The metallic aluminum is substantially pure aluminum powder so that it an react directly in reaction zone 50 and does not need to alloy with the weld bead material to produce a killing effect in the weld bead. After reaction in zone 50, a certain amount of aluminum may still exist. The aluminum residual enters the weld bead metal and combines with the nitrogen to fix the nitrogen or remove the nitrogen as a gas prior to solidification of the weld metal. Although the upper limit of 2.0% is generally sufficient to reduce the fume to a desired amount when using electrode 10, it has been found that this percentage of aluminum can be increased to approximately 5.0% by weight of fill material. With this higher level of aluminum powder, titanium dioxide and boron oxide is reduced for alloying purposes. In addition, further aluminum is available to remove oxygen from zone 50 to prevent formation of the nitrogen oxide. Further, residual aluminum can be introduced into the weld metal in small proportions for the purposes of reducing oxygen and nitrogen. Thus, for fume reduction the percentage of aluminum powder is preferably in the range of 0.5 to 2.0% of the flux material. The preferred range having full implementation of the advantages of the aluminum powder the upper limit of the percentage is up to 5.0% of fill material.

The flux formulation of the electrode also contains a dual stabilizing agent in a weight ratio of 2.4:1 to 3.5:1 stabilizing agent to aluminum powder. In a preferred embodiment, the ratio is 2.8:1. The highest reduction of fume during the welding process occurs when the weight ratio of the dual stabilizing agent to metallic aluminum powder is about 3:1. The amount of potassium oxide and sodium oxide forming the dual stabilizing agent, in weight percentage of the flux formulation, is 0.6 to 2.5% potassium oxide and 0.8 to 3.2% sodium oxide. Preferably 1.24% potassium oxide and about 1.62% sodium oxide is used in the flux formulation to obtain the desired results. The potassium oxide component of the dual stabilizing agent shortens and stabilizes the arc at lower electrode feed speeds and lower currents. The stabilization of the arc promotes a smooth metal transfer and reduces metal spatter. At higher electrode speeds and welding currents, sodium oxide enhances the arc stabilization characteristics of the electrode. The use of the dual stabilizing agents significantly increases the usable electrode feed rates as compared to prior E71T-1 electrodes. The wire speed ranges of prior E71T-1 electrodes have been limited because of spattery metal transfer at low currents, poor bead shapes, poor bead surface appearance, bead undercut and, at high wire feed speeds, excessive penetration due to excessive arc force. The dual stabilizer blend, in conjunction with the metallic aluminum powder, overcomes these limitations and provides an electrode in 1/16 inch diameter which can be fed at speeds ranging from 125 to 600 in/min and having a 4.6 to 22 lb/hr usable deposition rate. This deposition rate represents an increase of 20-30% over prior E71T-1 electrodes. Usable wire speed rates of 200-800 in/min are obtainable with 0.045 inch electrodes. The amounts of sodium oxide and potassium oxide can be adjusted to obtain the greater amount of fume reduction potential for a particular electrode feed rate.

The slag forming constituents of the flux consist of a titanium oxide based system. Typically, titanium oxide is in the form of rutile. Titanium oxide can constitute up to 65% of the flux formulation and preferably is present in amounts of about 53%. Other slag forming constituents consist of aluminum oxide, zirconium oxide silicon oxide, boron oxide, and calcium fluoride. These slag forming constituents have an ability to float to the surface of the molten weld pool and solidify before the molten weld metal solidifies, thus, preventing problems associated with slag inclusions in the weld bead which adversely affect the mechanical properties of the weld bead. The presence of aluminum oxide in conjunction with silicon oxide provides a slag viscosity which enables the slag to support the molten weld metal during out-of-position welding to further provide a high quality bead in both downhand and out-of-position welding.

It is also important that the electrode contain only small amounts of carbon. Any carbon within the steel sheath or flux formulation will result in the formation of additional fume during welding. The amount of carbon within the steel sheath should be less than about 0.07 weight percent of the electrode and preferably less than about 0.04 percent by weight.

The alloying ingredients used in the flux formulation include, but are not limited to, silicon, titanium, manganese and molybdenum. The amounts of the various alloying ingredients can be adjusted depending on the desired mechanical properties of the weld bead. Some alloying of the weld deposit will also occur due to a direct reduction by the aluminum of some of the oxides in the fill material. These oxides would include, but are not limited to, titanium oxide, silicon oxide, zirconium oxide and boron oxide. Magnesium is excluded as an alloying ingredient since magnesium interferes with the deoxidization by the aluminum powder. Magnesium is a very high reactive material which can reduce aluminum oxide to aluminum resulting in aluminum being inadvertently transferred to the weld bead, thus adversely affecting the strength of the weld bead. In addition, the reduction of aluminum oxide by magnesium will inhibit the metallic aluminum reacting with the oxygen and nitrogen during welding to reduce fume during welding.

A typical flux formulation (13.5 to 16.5% by weight core) of an example of the present invention, using weight percent of fill material, is as follows:

| Ingredient | Minimum | Maximum | Preferred Fume Reduction |
| --- | --- | --- | --- |
| Metallic Al | 0.5 | 5.0 | 1.0 |
| $Na_2O$ | 0.8 | 3.2 | 1.6 |
| $K_2O$ | 0.6 | 2.5 | 1.2 |
| $TiO_2$ | 40.0 | 65.0 | 53.0 |
| $SiO_2$ | 3.80 | 8.0 | 5.2 |
| $Al_2O_3$ | 0.00 | 1.4 | 0.60 |
| $CaF_2$ | 0.00 | 1.2 | 0.5 |
| $ZrO_2$ | 0.00 | 1.2 | 0.5 |
| $FeOx$ | 0.00 | 0.6 | 0.2 |
| $B_2O_3$ | 0.00 | 1.3 | 0.55 |
| Metallic Si | 0.00 | 8.5 | 5.5 |
| Metallic Ti | 0.00 | 1.6 | 1.0 |

-continued

| Ingredient | Minimum | Maximum | Preferred Fume Reduction |
|---|---|---|---|
| Metallic Mn | 0.00 | 16.2 | 10.0 |
| Metallic Fe | 0.00 | 14.7 | 9.7 |
| Metallic Mo | 0.00 | 0.73 | 0.3 |

The preferred shielding gas is 100% carbon dioxide, but other shielding gases such as argon, carbon dioxide blends and other inert gas blends can be employed.

The invention has been described with reference to the preferred embodiment. Obviously, modifications and alterations will occur to others upon a reading and understanding of this specification. It is intended to include all such modifications and alterations insofar as they come within the scope of the appended claims.

Having thus defined the invention, the following is claimed:

1. A consumable welding electrode for electric arc welding in a shielding gas and producing reduced amounts of fume during said welding comprising in combination a steel sheath and a filler within said sheath, said filler including metallic aluminum powder and a dual stabilizing agent of sodium oxide and potassium oxide wherein said stabilizing agent and said aluminum have about a 2.4:1 to 3.5:1 weight ratio.

2. The electrode as defined in claim 1, wherein said shielding gas is carbon dioxide.

3. The electrode as defined in claim 1, wherein said shielding gas is carbon dioxide, argon, or blends of argon with other inert gases, carbon dioxide, oxygen, or any combination thereof.

4. The electrode as defined in claim 1, wherein said filler includes titanium oxide based flux with fluxing ingredients including aluminum oxide, zirconium oxide, silicon oxide, boron oxide and fluorides or any combination thereof.

5. The electrode as defined in claim 1, wherein said weight ratio of said dual stabilizing agent to said metallic aluminum is about 3:1.

6. The electrode as defined in claim 1, wherein said filler includes alloying agents selected form the class consisting of titanium, zirconium, manganese, silicon and molybdenum, or any combination thereof.

7. The electrode as defined in claim 1, wherein said sheath is a low carbon steel sheath with less than about 0.07% carbon.

8. A consumable welding electrode for electric arc welding using a shielding gas and creating a reduced amount of fume and forming a weld bead containing less than about 0.1 weight percent aluminum comprised of a low carbon sheath containing a filler formulation comprising metallic aluminum, a stabilizing agent, titanium oxide based flux and alloying agents, said stabilizing agent and said metallic aluminum having a weight percent ratio of about 3:1.

9. The electrode as defined in claim 8, wherein said stabilizing agent consists of sodium oxide and potassium oxide.

10. The electrode as defined in claim 8, wherein said filler includes alloying agents selected from the class consisting of titanium, zirconium, manganese, silicon and molybdenum, or any combination thereof.

11. The electrode as defined in claim 8, wherein said titanium oxide based flux includes compounds selected from the group consisting of aluminum oxide, titanium oxide, silicon oxide, boron oxide, zirconium oxide and fluorides.

12. The electrode as defined in claim 8, wherein said low carbon sheath contains less than about 0.07 weight percent carbon.

13. A consumable welding electrode for electric arc welding in a shielding gas and producing a reduced amount of fume during welding and forming a weld bead containing less than about 0.1 weight percent aluminum, said shielding gas selected from the group consisting of carbon dioxide, inert gas, inert gas mixtures and mixtures thereof, said electrode comprising a low carbon sheath containing a filler formulation therein, said filler comprising of, by total weight of said filler 0.5% to 2.0% metallic aluminum and 1.4 to 5.7% stabilizing agent, wherein the weight ratio of said metallic aluminum to said stabilizing agent ranges between 1:2.4 to 1:3.5.

14. The electrode of claim 13, wherein said weight ratio is about 1:2.8.

15. The electrode of claim 13 wherein said filler, by percentage total weight of said filler comprises:

| Metallic Aluminum | 0.5 to 2.0 |
|---|---|
| Sodium Oxide | 0.8 to 3.2 |
| Potassium Oxide | 0.6 to 2.5 |
| Titanium Dioxide | 40.0 to 65.0 |
| Alloying Agents | 17.0 to 32.0 |

16. The electrode of claim 15, wherein said filler, by percentage total weight of said filler comprises:

| Metallic Aluminum | 0.5 to 2.0 |
|---|---|
| Sodium Oxide | 0.8 to 3.2 |
| Potassium Oxide | 0.6 to 2.5 |
| Titanium Dioxide | 40.0 to 65.0 |
| Aluminum Oxide | 0.0 to 1.4 |
| Silicon Oxide | 3.8 to 8.0 |
| Boron Oxide | 0.30 to 1.3 |

17. The electrode as defined in claim 15, wherein said low carbon sheath contains less than about 0.07 weight percent carbon.

18. The electrode as defined in claim 15, wherein said filler, by percentage total weight of said filler comprises:

| Metallic Aluminum | 0.99 |
|---|---|
| Sodium Oxide | 1.62 |
| Potassium Oxide | 1.24 |
| Titanium Dioxide | 52.64 |
| Silicon Oxide | 5.20 |
| Calcium Fluoride | 0.44 |
| Boron Oxide | 0.55 |
| Metallic Silicon | 5.48 |
| Metallic Titanium | 0.92 |
| Metallic Manganese | 10.3 |
| Metallic Molybdenum | 0.30 |

19. The electrode as defined in claim 15, wherein said filler, by percentage total weight of said filler comprises:

| Metallic Aluminum | 1.0 |
|---|---|
| Sodium Oxide | 1.6 |
| Potassium Oxide | 1.2 |
| Titanium Dioxide | 53.0 |
| Silicon Oxide | 5.2 |
| Calcium Fluoride | 0.5 |

| -continued | |
|---|---|
| Boron Oxide | 0.5 |
| Metallic Silicon | 5.5 |
| Metallic Titanium | 1.0 |
| Metallic Manganese | 10.0 |
| Metallic Molybdenum | 0.3 |

20. A consumable cored electrode for gas shielded arc welding and producing reduced amounts of fume during said welding and forming a weld bead containing less than about 0.1 weight percent aluminum, said electrode comprising a low carbon steel sheath with less than 0.07% by weight of said sheath carbon and a fill material within said sheath, said fill material being essentially free of non-ferrous carbon compounds and containing 0.5–5.0 percent metallic aluminum powder.

21. An electrode as defined in claim 20 wherein said carbon of said sheath is in the range of 0.02–0.04 percent by weight of said carbon.

22. An electrode as defined in claim 20 wherein said carbon of said sheath is less than 0.04% by weight of said sheath.

23. An electrode as defined in claim 20 wherein said metallic aluminum powder is less than about 2.0 percent by weight of said fill material.

24. An electrode as defined in claim 20 wherein said metallic aluminum powder is approximately 1.0 percent by weight of said fill material.

25. A method of arc welding with a shielding gas to produce a reduced amount of fume during said welding and forming a weld bead containing less than about 0.1 weight percent aluminum, said method comprising the steps of using a cored electrode with a ferrous sheath having less than 0.07% carbon and a fill material essentially free of carbon powder and non-ferrous carbon compounds and containing 0.5–5.9% metallic aluminum powder by weight of said fill material.

26. A consumable welding electrode for electric arc welding in a shield gas and producing reduced amounts of fume during said welding and forming a weld bead containing less than about 0.1 weight percent aluminum comprising in combination a steel sheath and a filler within said sheath, said filler including metallic aluminum powder and a stabilizing agent wherein said stabilizing agent and said aluminum have about a 2.4:1 to 3.5:1 weight ratio.

* * * * *